(12) United States Patent
Sahm

(10) Patent No.: US 6,658,973 B1
(45) Date of Patent: Dec. 9, 2003

(54) DEVICE FOR TRANSFERRING TWO-DIMENSIONAL PRODUCTS ONTO A TRANSPORTATION DEVICE

(75) Inventor: Dieter Sahm, Ingelbach (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 09/555,990

(22) PCT Filed: Nov. 21, 1998

(86) PCT No.: PCT/EP98/07505
§ 371 (c)(1),
(2), (4) Date: Jun. 7, 2000

(87) PCT Pub. No.: WO99/29599
PCT Pub. Date: Jun. 17, 1999

(30) Foreign Application Priority Data

Dec. 11, 1997 (DE) .......................... 197 55 058

(51) Int. Cl.⁷ .............................. B26D 7/06; B65H 5/22; B65G 15/28
(52) U.S. Cl. ................................ 83/155; 83/100; 83/99; 83/346; 83/669; 271/197; 271/276; 226/95; 226/170
(58) Field of Search .......................... 83/155, 152, 100, 83/105, 22, 37, 27, 99, 102, 325, 345, 346, 673, 154, 670; 271/275, 307, 69, 225, 6, 310, 276, 185, 309, 70, 188, 197; 226/95, 170; 198/408, 689.1, 377.04, 377.08, 456

(56) References Cited

U.S. PATENT DOCUMENTS

| 3,103,842 A | * | 9/1963 | Winkler et al. ............. 493/227 |
| 3,192,809 A | * | 7/1965 | Crouch et al. ................ 83/100 |
| 3,269,235 A | * | 8/1966 | Crouch et al. ........... 112/122.3 |
| 3,272,046 A | * | 9/1966 | Crouch et al. ................ 83/310 |
| 3,285,112 A | * | 11/1966 | Dale et al. ..................... 83/152 |
| 3,336,028 A | * | 8/1967 | Schonmeier ................. 271/197 |
| 3,380,327 A | * | 4/1968 | Stemmler .................... 493/363 |
| 3,388,905 A | * | 6/1968 | Nash et al. .................... 271/13 |
| 3,477,558 A | * | 11/1969 | Fleischauer .............. 198/689.1 |
| 3,545,631 A | * | 12/1970 | Mojden et al. .......... 414/788.4 |
| 3,889,801 A |   | 6/1975 | Boyer |
| 4,041,816 A | * | 8/1977 | Shearon ....................... 83/100 |
| 4,080,856 A | * | 3/1978 | Shearon ....................... 83/100 |
| 4,373,848 A | * | 2/1983 | Bishop ....................... 414/403 |
| 4,385,537 A | * | 5/1983 | Wolf .......................... 271/273 |
| 4,608,115 A | * | 8/1986 | Schroth et al. ............. 156/164 |

(List continued on next page.)

FOREIGN PATENT DOCUMENTS

| DE | 32 30 662 | 4/1983 |
| DE | 44 33 912 | 3/1996 |
| EP | 0 439 897 A | 8/1991 |
| EP | 0 491 168 A | 6/1992 |

Primary Examiner—Boyer D. Ashley
(74) Attorney, Agent, or Firm—Jordan and Hamburg LLP

(57) ABSTRACT

A device for transferring segregated flat-shaped products includes a transfer device and a transport device by which the products transferred from the transfer device are further transported along a transport path. The transport device includes a moveable transport surface having suction openings communicative with a vacuum container. The transfer device includes a roll arranged transverse to the transport path and having suction orifices arranged about a circumference thereof. The roll has internal channels having openings in opposed axial end faces of said roll which are communicative with the suction orifices. Vacuum chamber members are disposed axially at the opposed end faces of the roll which is rotatable relative to the vacuum chamber members. Each of the vacuum chamber members has a concentric grove and a ventilation channel which correspond to the openings of the internal channels. The concentric grove is connected with a vacuum conduit and the ventilation channel faces the transport device and is connected with the atmosphere.

6 Claims, 5 Drawing Sheets

U.S. PATENT DOCUMENTS

Figure 1:
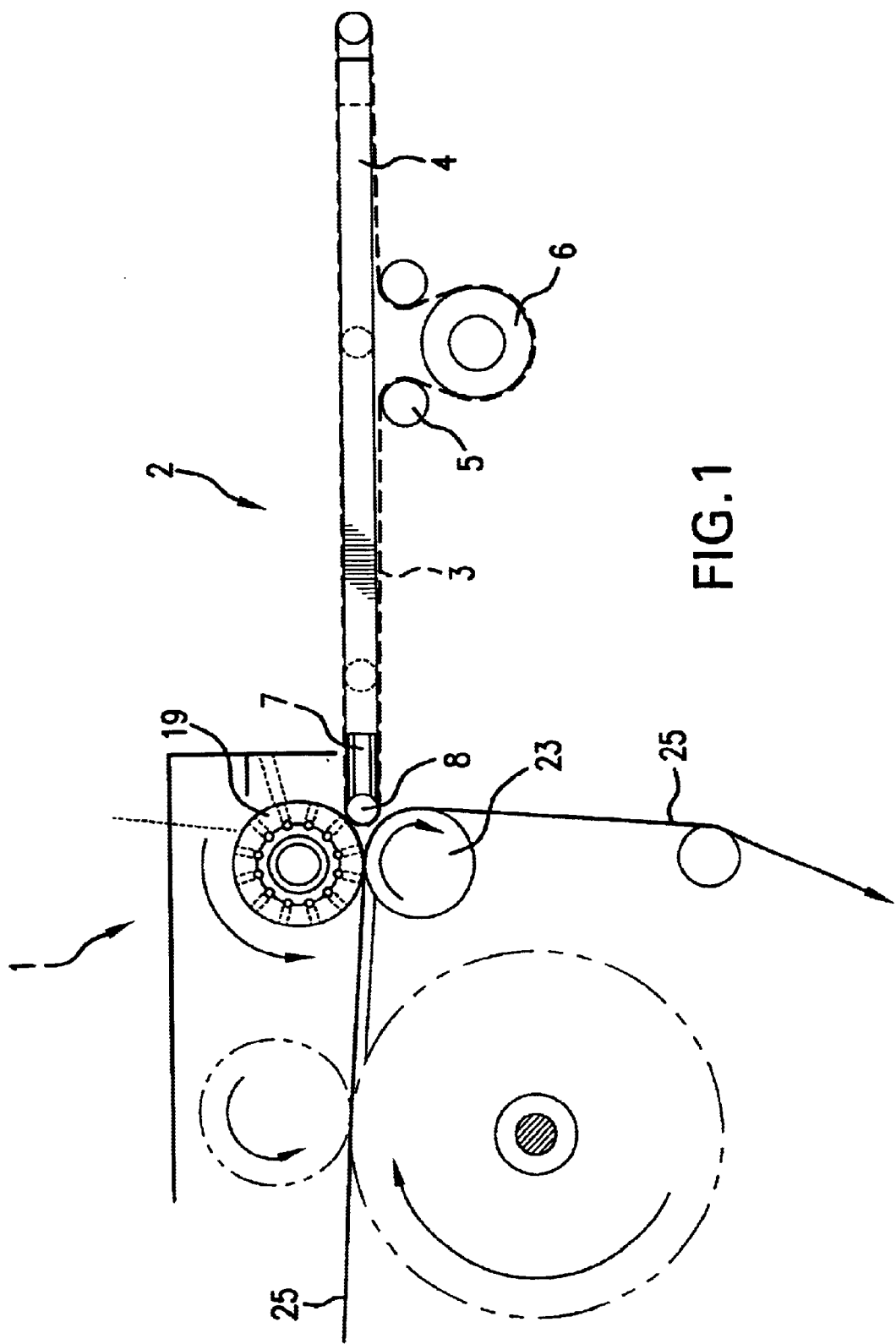

| | | | | |
|---|---|---|---|---|
| 5,104,116 A | * | 4/1992 | Pohjola | 198/377.1 |
| 5,109,741 A | * | 5/1992 | Fuchs | 83/100 |
| 5,114,307 A | | 5/1992 | Meli et al. | 414/793.1 |
| 5,193,423 A | * | 3/1993 | Bakker | 83/24 |
| 5,224,405 A | * | 7/1993 | Pohjola | 156/519 |
| 5,570,620 A | * | 11/1996 | Okonski et al. | 83/152 |
| 5,609,084 A | * | 3/1997 | Gronbjerg | 83/100 |
| 5,979,279 A | * | 11/1999 | Matsumoto et al. | 83/24 |
| 6,026,725 A | * | 2/2000 | Okonski | 83/698.21 |
| 6,139,004 A | * | 10/2000 | Couillard et al. | 271/70 |
| 6,227,541 B1 | * | 5/2001 | Couillard et al. | 198/408 |
| 6,269,720 B1 | * | 8/2001 | Pelagatti | 83/343 |
| 6,405,914 B1 | * | 6/2002 | Broom et al. | 226/95 |

* cited by examiner

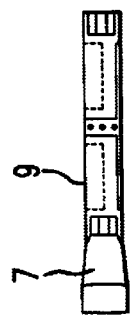
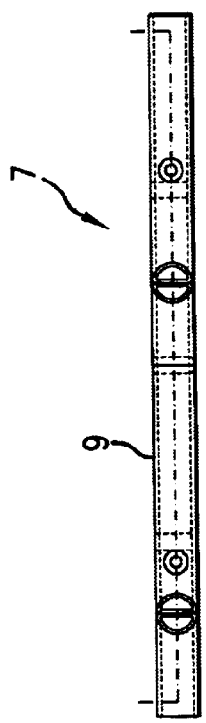
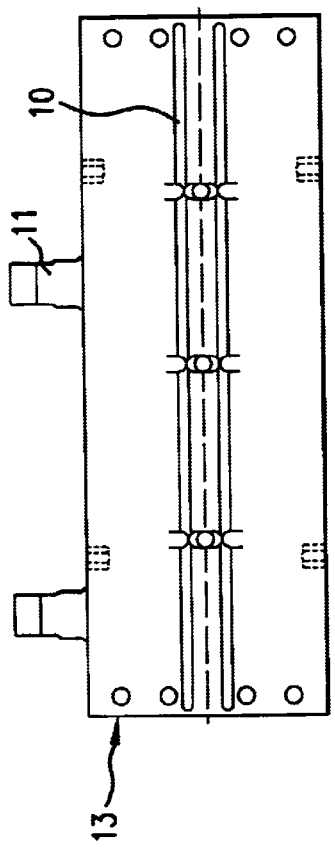
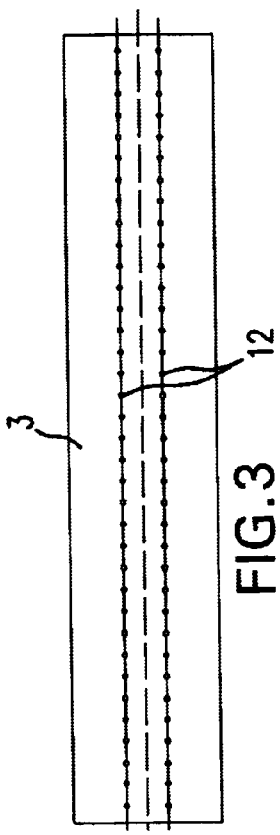

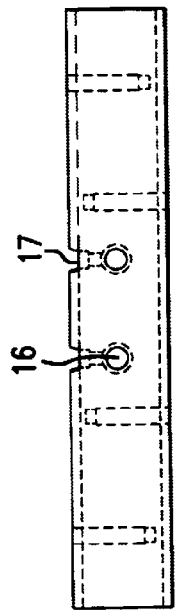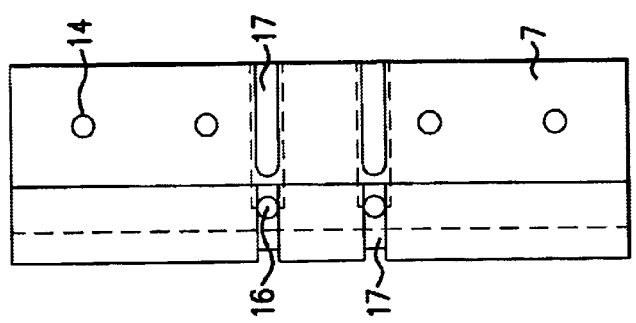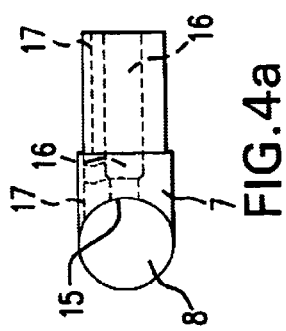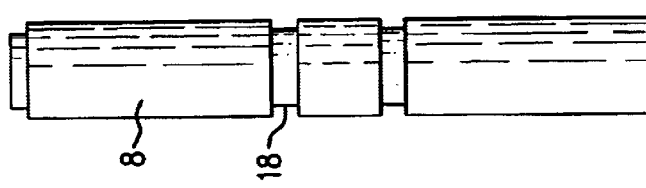

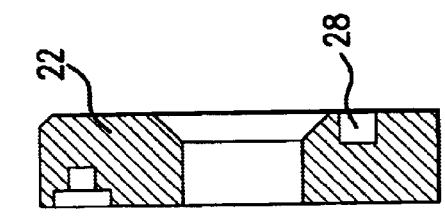
FIG. 7b
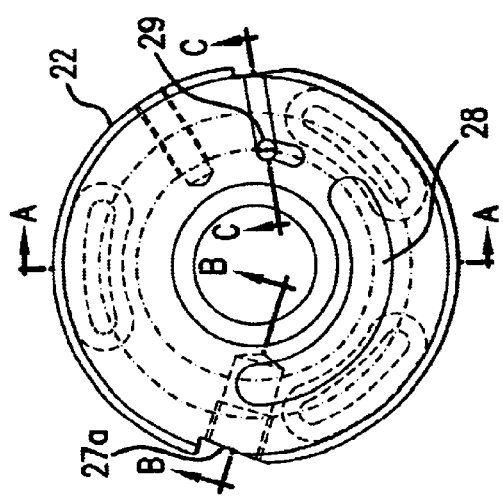
FIG. 7a
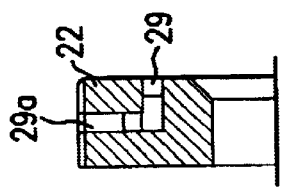
FIG. d
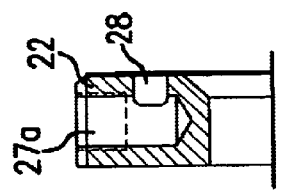
FIG. 7c

DEVICE FOR TRANSFERRING TWO-DIMENSIONAL PRODUCTS ONTO A TRANSPORTATION DEVICE

This invention relates to a device for the transfer, in particular the continuous transfer, of segregated flat-shaped products to a transport device, preferably of plasters, pressure-sensitive adhesive labels or postage stamps.

It is known to employ transfer devices for flat-shaped products which comprise deflecting edges, transfer rolls and also stripping plates for detaching segregated flat-shaped products in a transfer device. However, receiving the said products—which have yet been transferred in a particular order—in a likewise ordered fashion by means of a device transporting the products further is problematic since the order cannot be ensured, especially not in the case of continuous transfer. The products are transported further in rearranged order, which makes the removal thereof for the purpose of packaging or further processing more difficult.

It is the object of the present invention to create a device for the transfer of segregated flat-shaped products according to the introductory portion of claim 1, which device permits the ordered transfer of the products from a transfer device and the continued transport of the products in the ordered arrangement.

This object is achieved in a device according to the introductory portion of claim 1 by means of the features according to said claim.

The invention consists in that the transfer device comprises a receiving device which is integrated in a transport device supplying the further transport of the segregated flat-shaped products, said transport device being coupled to a vacuum device such that the products are, in cooperation with the transport device, received in an ordered fashion and fixed thereto. This ensures the continued transport of the products in the ordered arrangement.

The transport device may be a conveyor belt having evenly arranged suction orifices connected to the vacuum device.

The vacuum device is advantageously configured such that it comprises a deflecting strip for the conveyor belt which faces the transfer device and to which a vacuum may be applied and which is provided with a slide surface for the conveyor belt, to which slide surface a vacuum can be applied also, with grooves and/or slots being arranged in said deflecting strip and in said slide surface which correspond to the said suction orifices and through which air can be sucked off continuously.

In a simple manner the vacuum device can be provided with a vacuum container which is configured along the transport path and on which the slide surface for the conveyor belt and also the deflecting strip are configured. Via connection pieces, the said vacuum container may be equipped with one or more ducts leading to a vacuum pump.

To keep friction between the conveyor belt and the vacuum container low, it is advantageous for the deflecting strip to be provided with a deflecting roll which has circumferential grooves arranged therein as suction orifices, said grooves being connected with the inner space of the vacuum container.

The conveyor belt is provided at the end of the vacuum container which faces away from the deflecting strip with a discharge device for discharging the products, at which device the vacuum acting on the conveyor belt is blocked so that the products can be removed in an ordered manner by suitable means.

The transfer device may be a roll to which a vacuum is applied and which is provided on its surface with suction orifices for the products. The deflecting strip and the conveyor belt which is led around it and the said roll are arranged parallel to each other and spaced such that the products are only just able to pass through the slot formed therebetween without being obstructed, i.e. without touching the conveyor belt. Following this slot (seen in the direction of transport) there is configured a transfer area wherein the connection between the suction orifices to the vacuum-generating device for the roll is blocked. The suction connection between the products and the roll is thereby eliminated, so that the products can be aspirated by the rotating conveyor belt and fixed in the arrangement predetermined by the transfer device and subsequently transported further.

To facilitate and accelerate the transfer process, the suction orifices of the rotating roll can be adapted to be connectable in the transfer region with a blowing device, so that in this region the products are rejected by the roll.

The roll may advantageously be configured to function simultaneously as a punching roll by providing on the circumference thereof cutting edges for punching, in accordance with the desired shape of the products. It is possible thereby to unite the segregating device and the transfer device in a simple manner.

Figure 6:
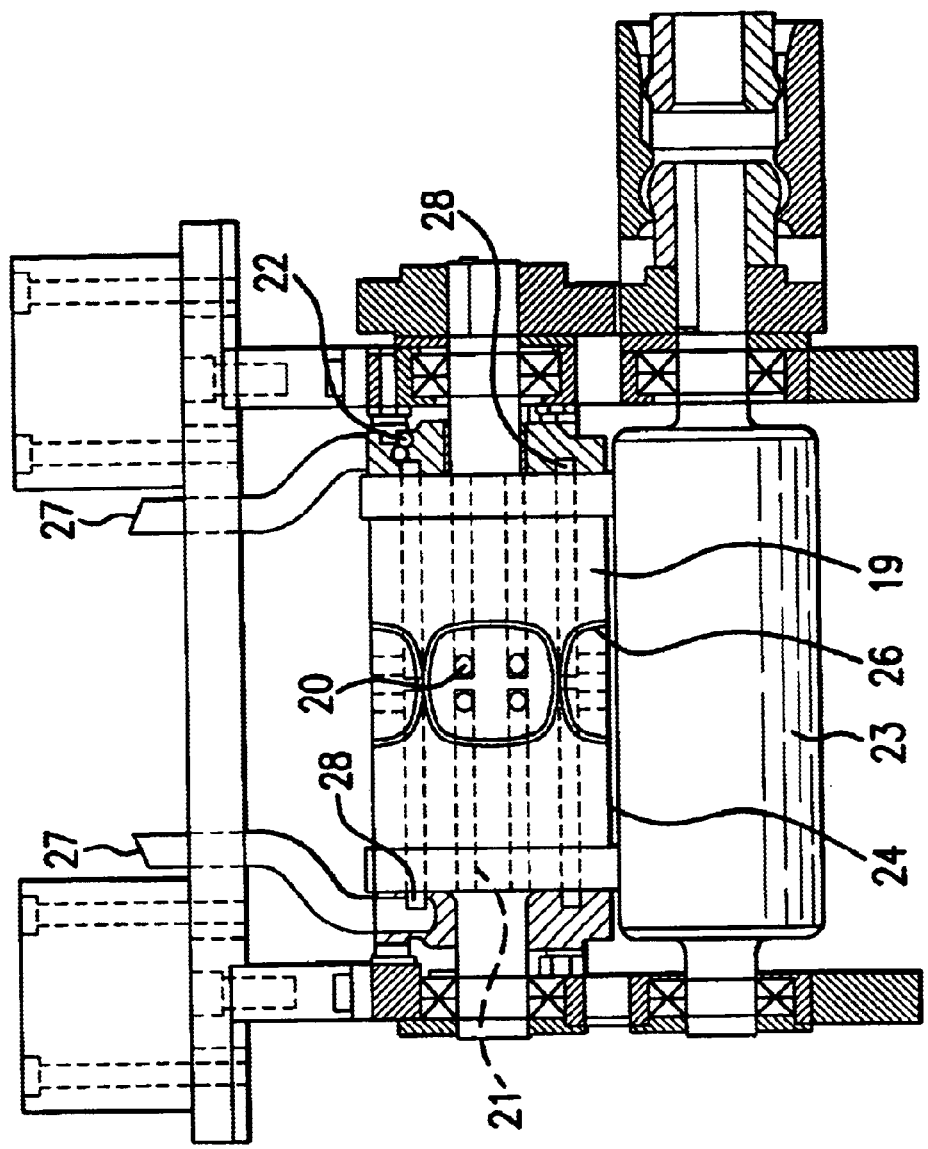

The invention will be explained in the following in greater detail with reference to an example of an embodiment thereof. The Figures pertaining thereto show (in part schematically):

FIG. 1: a device according to the present invention for transferring segregated flat-shaped products, FIG. 2a: a front view of a vacuum container for a conveyor belt which provides the further transport of the products, FIG. 2b: a plan view of the vacuum container, FIG. 2c: a side view of the vacuum container, FIG. 3: a plan view of the conveyor belt, FIG. 4a: a front view of the deflecting strip for the conveyor belt, to which deflecting strip there can be applied a vacuum, FIG. 4b: a plan view of the deflecting edge, FIG. 4c: a side view of the deflecting edge, FIG. 5: a deflecting roll, FIG. 6: a transfer device with a punching roll, seen from the conveyor belt, FIG. 7a: a vacuum chamber for the punching roll, FIG. 7b: a vertical section along A—A of the vacuum chamber, FIG. 7c: a section along B—B through the vacuum chamber, and FIG. 7d: a section along C—C through the vacuum chamber.

FIG. 1 is a schematic representation of a device made up of a transfer device 1 for the transfer of segregated flat-shaped products P in an ordered arrangement and a transport device receiving the products P and transporting them further. The transport device 2 has a conveyor belt 3 coupled with a vacuum device (not shown), said conveyor belt 3 being led around a cuboid vacuum container 4 belonging to the vacuum device and two tension rolls 5 disposed therebelow and a driven roll 6. The conveyor belt 3 is arranged slidably on the upper side of the vacuum container 4. At the side facing the transfer device 1 there is arranged on the vacuum container 4 a deflecting strip 7, to which a vacuum can be applied, with a deflecting roll 8, along which the conveyor belt is deflected.

FIGS. 2a–c show that the vacuum container 4 has on its upper side a slide surface 9 for the conveyor belt 3, which is equipped with slots 10. Two connection pieces 11 serve to connect the vacuum container 4 to a vacuum pump (not shown). On the left-hand side of FIGS. 2a and 2b, the deflecting strip 7 can be arranged so as to be tight with deflecting roll 8, which roll is represented in FIGS. 4a–c and FIG. 5, and which closes the vacuum container 4 against the transfer device.

The conveyor belt 3 (FIG. 3) has regularly configured suction orifices 12 disposed above slots 10 and which, via said slots, provide a constant connection between the transport surface of the conveyor belt 3 and the interior of the vacuum container 4. In the slide surface 9 there are provided bores 13 for fixing screws for attachment of the deflecting strip 7.

The deflecting strip 7 is configured as an insert for the vacuum container 4 and can be screwed thereto. To this end, the deflecting strip 7 has threaded bores 14 which correspond to the bores 13. It is further provided with a shell-like plain bearing surface 15 for the deflecting roll 8, so as to achieve an optimum seal, the deflecting strip 7 being made of a wear-resistant and slidable plastic. In the deflecting strip 7 there are incorporated suction bores 16 and channels 17, which provide a connection between the transport surface of the conveyor belt 3 and the interior of the vacuum container 4. The deflecting roll 8 has two circumferential grooves 18 which correspond with the suction bores 16 and the channels 17.

The conveyor belt 3 is arranged on the vacuum container 4 and the deflecting roll 8 with such tension that an optimal seal of the same against the deflecting strip 7 is provided, without, however, impeding movement of the conveyor belt. On the side of the vacuum container 4 facing away from the deflecting strip 7, said vacuum container 4 is closed with a sealing strip (not shown) which forms a component of a discharge device.

The transfer device 1 (FIG. 6) comprises a punching roll 19, to which a vacuum is applied; in the area of the flat-shaped products P to be transferred, the surface of said punching roll 19 is provided with suction orifices 20 which lead via channels 21, formed in the interior of the punching roll 19, to vacuum chambers 22 disposed at the end faces. Together with a counter pressure roll 23, the punching roll 19 forms a slot 24 for the passage of the web 25, from which the products P are punched out. To this end, the punching roll 19 is provided with cutting edges 19 which correspond to the shape of the products.

The vacuum chambers which connect the punching roll 19 with a vacuum pump (not shown) have a concentric groove 28 as well as a ventilation channel 29 which correspond with the end-face openings of the channels 21. Groove 28 is connected via a threaded bore 27a with a conduit 27, and the ventilation channel 29 is connected via a bore 29a with the atmosphere (FIGS. 7a–d). The vacuum chambers 22 are disposed axially and rotatably relative to the punching roll 19, so that it is possible to set various alternating positions and thus various positions of the respective groove 28 and the respective ventilation channel 29 relative to the transport device 2.

The transfer device 1 and the transport device 2 are arranged relative to each other in such a way that the products P are able to pass through the slot formed between the two devices (1; 2) without being obstructed, but lie within the suction area of the transport device 2.

The transfer device functions such that a web of material 25, from which the products P are to be segregated and transported further, is conveyed between the punching roll 19 and the counter pressure roll 23 and passes over the latter. In this process, the products P are severed from the web 25 by the cutting edges 26. The vacuum chambers 22 are adjusted such that the suction orifices 20 above which there is the respective product P which is just being punched are connected via the channels 21 and the groove 28 with the vacuum ducts 27, so that the product P, after having been severed, initially remains aspirated at the rotating punching roll 19. The product P adheres to the punching roll 19 until the channels 21 are rotated out of the region of the groove 28 and enter the region of the ventilation channel 29. At that point at the latest, will the respective product P become detached from the punching roll 19. Due to the given arrangement of the transport device 2 and the immediate proximity of the sucking conveyor belt 3 which above the deflecting roll 8 is already within the suction region, the punched-out products P are successively (possibly also side by side) aspirated, taken over in the arrangement as predetermined by the transfer device 1 and transported further in the said arrangement.

What is claimed is:

1. A device for transferring segregated flat-shaped products from a web supplied along a transport path for further transport of the products following removal thereof from the web, said device comprising:

a transfer device including a roll arranged transverse to the transport path, said roll having suction orifices arranged about a circumference thereof and internal channels having openings in opposed axial end faces of said roll, said internal channels being communicative with said suction orifices, said transfer device further including vacuum chamber members disposed axially at the opposed axial end faces of said roll, said roll being rotatable relative to said vacuum chamber members, each of said vacuum chamber members having a concentric groove and a ventilation channel which radially correspond to the openings of said internal channels, said concentric groove being connected with a vacuum conduit and said ventilation channel being connected with atmosphere and facing said transport device; and a transport device for transporting the products along the transport path when transferred thereto from the transfer device, said transport device including a vacuum container and a conveyor belt having suction openings communicative with an interior of said vacuum container, said transfer device further comprising deflecting structure disposed at an end of said vacuum container facing said roll of said transfer device around which the conveyer belt is deflected, said deflecting structure having cutouts communicative with said interior of said vacuum container which positionally correspond with said suction openings in said conveyer belt.

2. A device according to claim 1, wherein the ventilation channel is structurally adapted for connection to a blowing device.

3. A device according to claim 1 wherein said roll is a punching roll including punching members.

4. A device according to claim 1, wherein said deflecting structure includes a defecting strip earred on said vacuum container and a deflecting roll conformably engaging said deflecting strip, said cutouts in said deflecting structure comprising external channels in said deflecting strip and circumferential grooves in the deflecting roll which are aligned with said external channels.

5. A device according to claim 4, wherein said vacuum container extends along a length of said transport device and is configured with a slide surface.

6. A device according to claim 4, wherein said roll is arranged at a distance from said deflecting structure and to the conveyor belt forming a slot therebetween which is sized to permit unobstructed passage of the products therethrough.

\* \* \* \* \*